(12) United States Patent
Simon

(10) Patent No.: US 6,343,771 B1
(45) Date of Patent: Feb. 5, 2002

(54) RUNG OR UPRIGHT FOR CABLE LADDER CABLE LADDER AND PROCESS FOR ASSEMBLING SAME

(75) Inventor: Bernard Simon, Caluire (FR)

(73) Assignee: Mavil, Liernais (FR)

( * ) Notice: Subject to any disclaimer, the term of this patent is extended or adjusted under 35 U.S.C. 154(b) by 0 days.

(21) Appl. No.: 09/604,664

(22) Filed: Jun. 27, 2000

(30) Foreign Application Priority Data

Jun. 28, 1999 (FR) .............................. 99 08433

(51) Int. Cl.$^7$ ................................. F16L 3/00
(52) U.S. Cl. ................... 248/49; 403/230; 403/249
(58) Field of Search ................. 182/228.1, 228.3, 182/228.6, 228.2; 248/49; 403/187, 230, 242, 244, 249

(56) References Cited

U.S. PATENT DOCUMENTS

| 3,355,132 A | 11/1967 | Jenkins | 248/59 |
| 5,961,081 A | * 10/1999 | Rinderer | 248/68.1 |
| 6,077,014 A | * 6/2000 | Gulistan | 411/396 |
| 6,123,586 A | * 9/2000 | MacDougall | 439/701 |
| 6,198,602 B1 | * 3/2001 | Vera et al. | 360/244.5 |

FOREIGN PATENT DOCUMENTS

| DE | 7820462 | 12/1979 |
| DE | 3829306 | 3/1990 |
| GB | 2163011 A | * 2/1986 |

\* cited by examiner

Primary Examiner—Ramon O. Ramirez
(74) Attorney, Agent, or Firm—Dowell & Dowell, P.C.

(57) ABSTRACT

This invention relates to a rung for a cable ladder which comprises at least one orifice for passage of an attachment member to an upright and two elements in relief disposed on each side of this orifice and adapted to be engaged in an oblong perforation in the upright in which the attachment member is received.

In the case of an upright, it is the upright which bears the orifice and the elements in relief adapted to be engaged in an oblong perforation in the rung.

A cable ladder according to the invention is easier to assemble due to the self-centering obtained, and the screws or rivets used for attachment are subjected to less shear.

14 Claims, 3 Drawing Sheets

RUNG OR UPRIGHT FOR CABLE LADDER CABLE LADDER AND PROCESS FOR ASSEMBLING SAME

FIELD OF THE INVENTION

The present invention relates to a rung or upright for a cable ladder, to a cable ladder and to a process for assembling same.

BACKGROUND OF THE INVENTION

As shown in accompanying FIG. 5, it is known to make a cable ladder for supporting electrical leads, in a vertical or horizontal configuration, by assembling lateral uprights 101 and tie-bars or rungs 102, these rungs extending principally in a direction substantially perpendicular to that of the uprights. These uprights and rungs are assembled together by means of screws or rivets 103 which allow immobilization of the rungs and the screws in a direction perpendicular to the plane of FIG. 5. Oblong perforations 104 are usually provided in the uprights 101 and oblong perforations 105 in the rungs 102, these perforations allowing, on the one hand, passage of the screws 103 and, on the other hand, passage of the ties for attaching the leads (not shown in FIG. 5). A comparison of the solid-line configuration and that in dashed and dotted lines in FIG. 5 shows that the rungs 102 can pivot with respect to the uprights 101 parallel to the plane of FIG. 5, with the result that the ladder can be deformed, which is both unaesthetic and may lead to parasitic movements of the ladder. In addition, in the known configuration, the screws or rivets 103 are subjected to an intense shearing effort which may lead to rupture thereof.

It is a particular object of the present invention to overcome these drawbacks by proposing a rung structure which allows a particularly solid assembly with known uprights, without risk of deformation of the ladder produced and with a considerable reduction of the shearing effort undergone by an attaching member.

SUMMARY OF THE INVENTION

To that end, the invention relates to a rung for a cable ladder comprising at least one orifice for passage of a member for attachment to an upright, characterized in that it also comprises two elements in relief arranged on either side of this orifice and adapted to be engaged in an oblong perforation in the upright in which the attachment member is received.

Thanks to the invention, the elements in relief make it possible to centre the orifice for passage provided in the rung with respect to the oblong perforation provided in the upright and thus to create a plurality of points of contact between the rung and the edge of the oblong perforation, with the result that pivoting of the bar about the axis of the attachment member may be avoided. The elements in relief may bear against the edges of the oblong perforation, with the result that they absorb most of the shearing efforts to which the join between the rung and the upright is subjected. The attachment member, which may be a screw or a rivet, is accordingly less subjected to shear.

The invention is also applicable if the above-described structure is inverted, in which case it relates to an upright for cable ladder which comprises at least one orifice for passage of a member for attachment to a rung and two elements in relief disposed on either side of this orifice and adapted to be engaged in an oblong perforation in the rungs in which the attachment member is received.

As previously, the elements in relief participate in the centering and take-up of effort between the rung and the upright.

Whatever the variant considered, the elements in relief are advantageously formed by bosses obtained by localized deformation of a web of the rung or the upright. These elements in relief are thus particularly economical, while being able to withstand considerable efforts.

According to an advantageous aspect of the invention, these elements in relief present a geometry adapted each to abut against the edge of the oblong perforation, the cooperation of shapes between these elements in relief and this edge ensuring a relative immobilization of the rung and the upright around the attachment member.

The elements in relief can also be provided to be deformable, by tightening the attachment member, so that they come into close abutment against the edge of the oblong perforation. In this way, the effect of positioning and tightening the attachment member is to crush these elements in relief to the point of being blocked against the edge of the oblong perforation.

According to other advantageous aspects of the invention, the elements in relief can be provided to be substantially conical or in the form of a spherical cap, with a maximum diameter substantially equal to the smallest dimension of the oblong perforation.

In addition, in this case of a rung, an orifice for passage of an attachment ember and two elements in relief are provided near each of the ends of the rung.

The invention also relates to a cable ladder comprising at least one lateral upright and a rung as described hereinabove. Such a ladder is more rigid than the prior art ladders, while its cost price is not substantially modified with respect thereto.

Finally, the invention relates to a process for assembling such a ladder as described hereinabove, in which a rung and a lateral upright are connected by inserting an attachment member in an orifice in this rung and a perforation in this upright. This process consists in positioning the orifice and the perforation with respect to each other, introducing into this perforation elements in relief disposed on either side of this orifice.

BRIEF DESCRIPTION OF THE DRAWINGS

The invention will be more readily understood on reading the following description of an embodiment of a cable ladder in accordance with its principle, given soley by way of example and with reference to the accompanying drawings, in which.

DESCRIPTION OF PREFERRED EMBODIMENT

Figure 2:
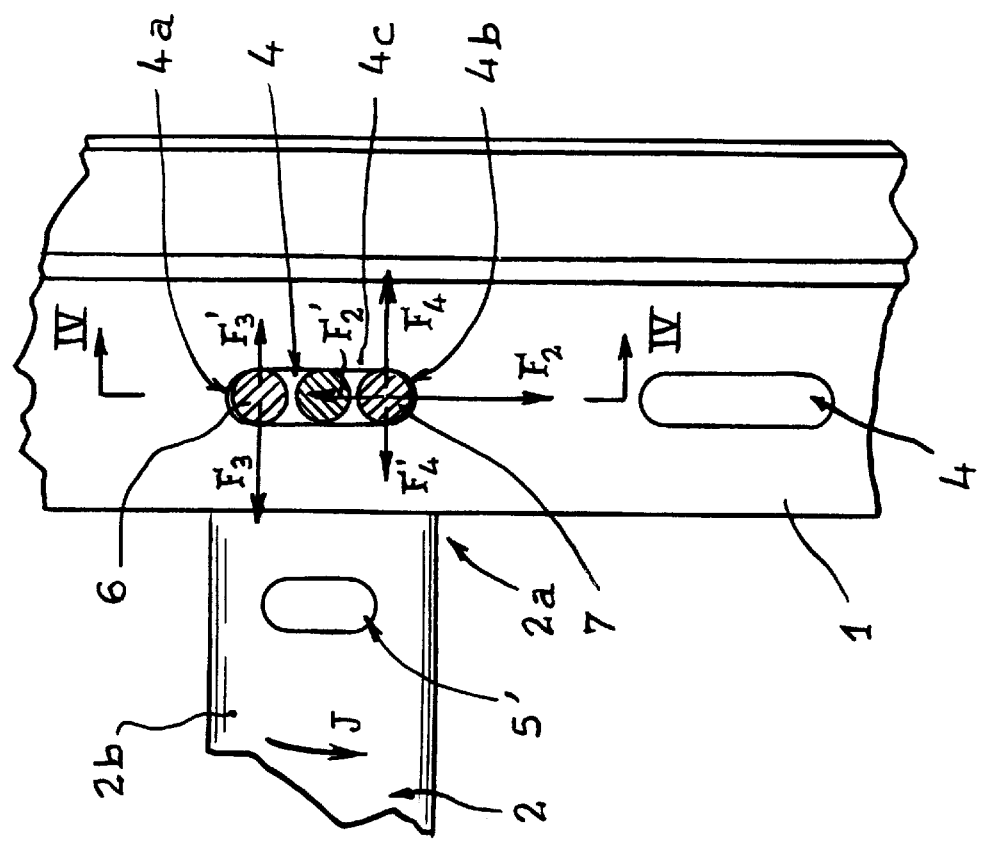
FIG. 2 is a view on a larger scale of detail II of FIG. 1.
Figure 1:
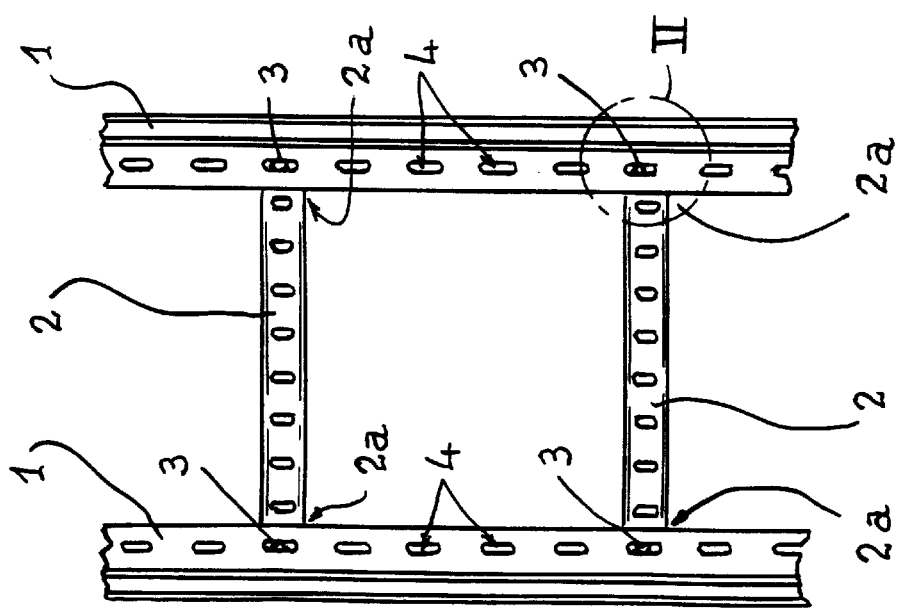
FIG. 1 shows a ladder according to the invention.

Referring again to the drawings, the cable ladder shown in FIGS. 1 to 4 comprises two lateral uprights 1 connected by rungs 2 with which they are fast thanks to rivets 3 provided to traverse both oblong perforations 4 in the uprights 1 and a cylindrical orifice 5 provided near each end 2a of a rung 2.

As in the devices of the state of the art, the rungs 2 are provided with oblong perforations 5' allowing the passage of ties for fastening the leads that the ladder is to support.

Figure 3:
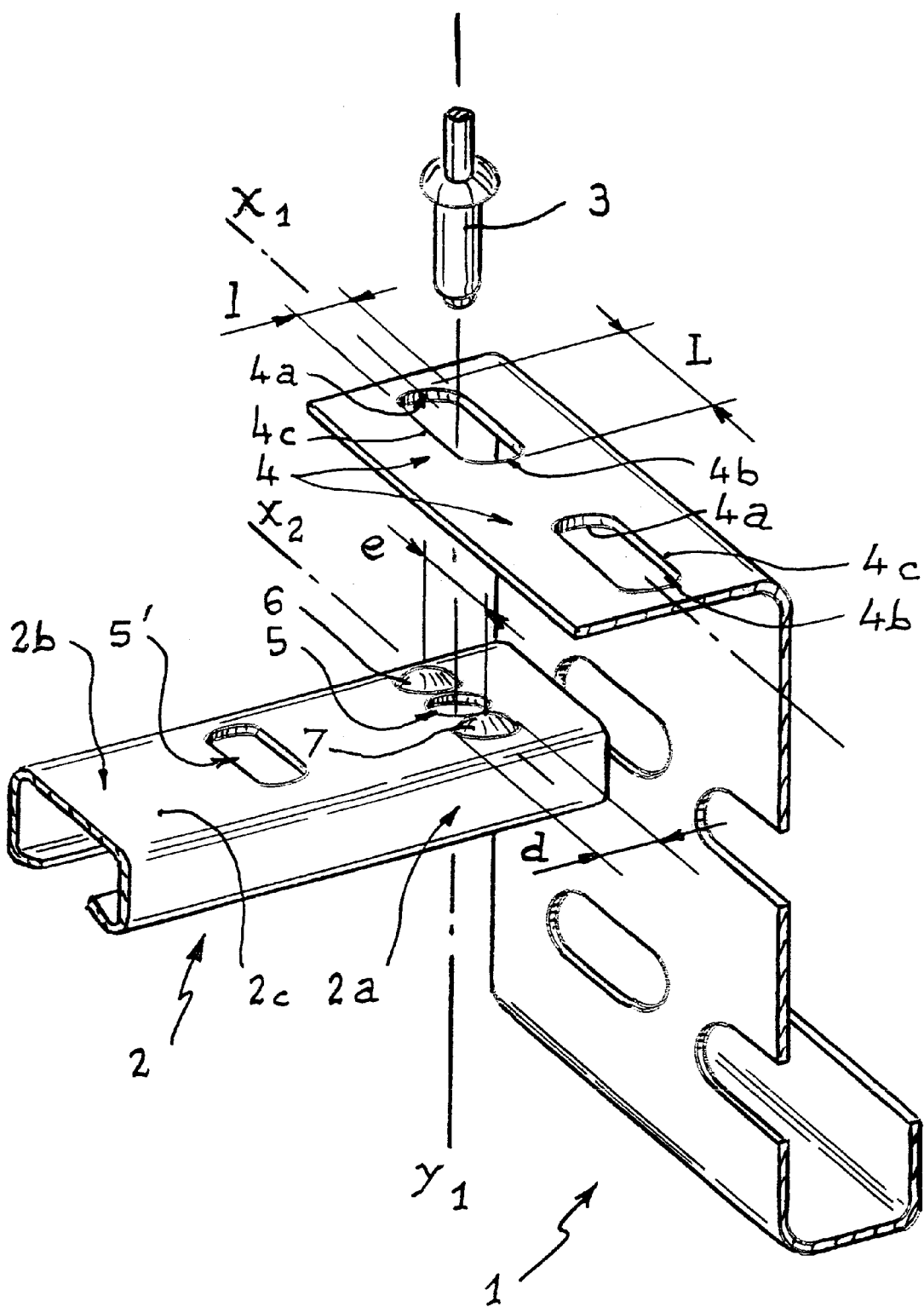
FIG. 3 is an exploded view in perspective showing the link between a rung and a lateral upright of the ladder of FIGS. 1 and 2.

As is more clearly visible in FIG. 3, two bosses 6 and 7 are provided on either side of each orifice 5. More precisely, $X_1$ denotes the longitudinal axis of the perforations 4 provided on one flange of an upright 1. The bosses 6 and 7 are disposed on either side of the orifice 5 in a direction $X_2$ parallel to axis $X_1$ when elements 1 and 2 are in assembled position. The bosses 6 and 7 are obtained by stamping or punching a central web 2a of the rung 2.

The end 2a of a rung 2 is assembled on an upright 1 by bringing the orifice 5 towards the central part of a perforation 4 and by introducing a rivet 3 through the perforation 4 and the orifice 5, then deforming this rivet to block the elements 1 and 2 in a direction $Y_1$ perpendicular to axis $X_1$.

When the orifice 5 is brought towards the perforation 4, the bosses 6 and 7 are introduced in end zones 4a and 4b of the perforation 4, with the result that they centre the orifice 5 with respect to the perforation 4.

The bosses 6 and 7 are of substantially truncated shape and d denotes their maximum diameter, i.e. their diameter at the level of the upper face 2b of the central web 2c of the rung 2. Furthermore, e denotes the distance between the centres of bosses 6 and 7.

L denotes the length of a perforation 4 and l its width. The diameter d is chosen to be substantially equal to the width l, while the distance e is chosen so that the sum of its value and of the diameter d is substantially equal to the value of the length L. In this way, the cooperation of shapes between the bosses 6 and 7 and the edge 4c of the perforation 4 allows self-centering of the orifice 5 with respect to this perforation.

Figure 4:
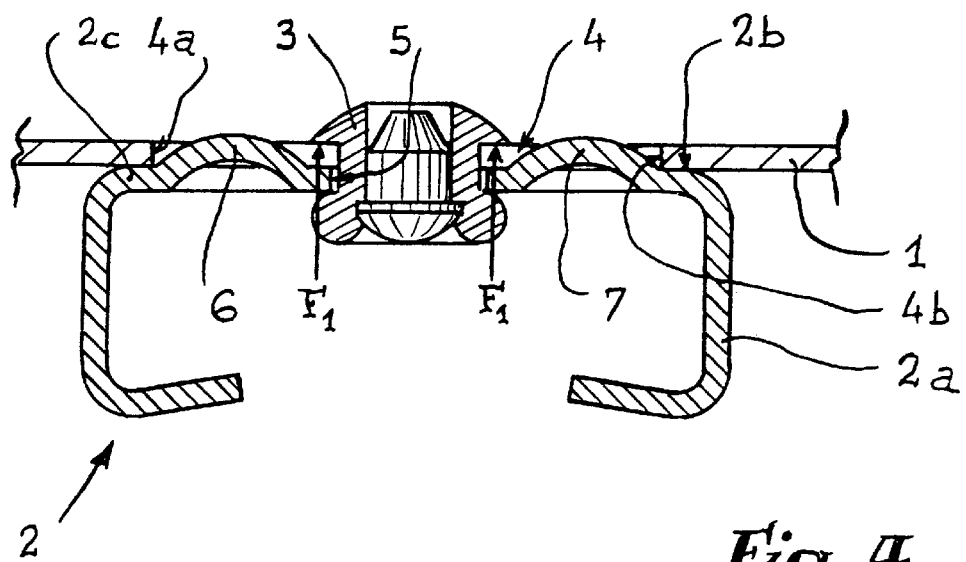
FIG. 4 is a section along line IV—IV in FIG. 2.
Figure 5:
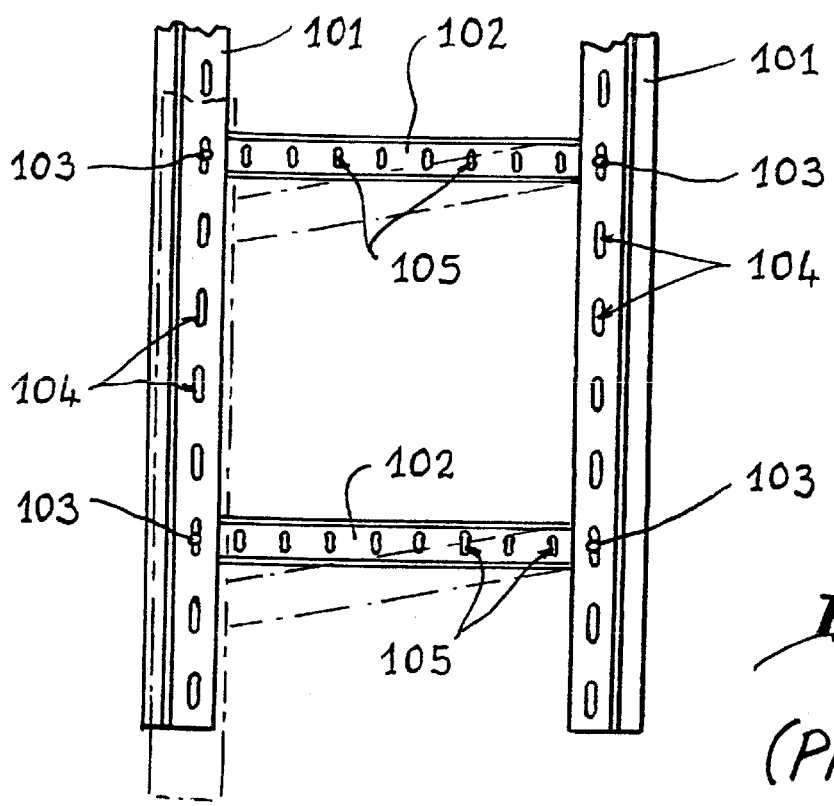
FIG. 5 is a view similar to FIG. 1 of a ladder according to the prior state of the art.

When elements 1 and 2 are in assembled configuration, as shown in FIGS. 2 and 4, the bosses 6 and 7 undergo a tightening effort $F_1$ resulting from the tightening of the rivet 3, this effort tending to deform bosses 6 and 7 by crushing them, with the result that they tend to expand in the direction of the edge 4c of the perforation 4, which further improves contact between the elements 4c, 6 and 7.

As is seen more clearly in FIG. 2, in the case of a vertical ladder, the weight of the rung 2 is exerted, at the level of the join of the rung and the upright, in a substantially vertical direction, as represented by arrow $F_2$. An upwardly directed force of reaction represented by arrow $F'_2$ is generated at the level of the edge 4c of the perforation 4 and balances this weight.

Furthermore, a moment J tending to tip the lever 2 in the trigonometric sense about the axis of the rivet 3 has the effect of creating two efforts $F_3$ and $F_4$ resulting in an abutment of the bosses 6 and 7 respectively against the left-hand side of edge 4c at the level of zone 4a and the right-hand side of edge 4c at the level zone 4b. Two equivalent forces of reaction $F'_3$ and $F'_4$ are then generated by the upright 1, with the result that a moment of reaction adapted to moment J is created, which avoids any deformation of the ladder.

It follows from the foregoing that the rivet 3 is not subjected directly to efforts $F_2$ and J.

The shearings which exist in the known devices are not reproduced in a ladder according to the invention, this substantially increasing its life-time. Mechanical tests have confirmed a much increased resistance of the points of attachment of the rungs 2 on the uprights 1.

The bosses 6 and 7 may present a configuration in the form of a spherical cap and more generally any configuration enabling them to cooperate with the edges of the perforations 4. The transverse dimension of the bosses 6 and 7 is advantageously adapted to the width of the perforation in order to obtain an effect of self-centering.

The conical nature of the bosses 6 and 7, and more generally the progressive nature of their width as one approaches the upper face of the rung 2, ensures a tangential contact between these bosses and the edge of the oblong perforation, including with hot-galvanized products.

The self-centering obtained between the rungs and uprights makes it possible largely to facilitate assembly of a cable ladder, hence a substantial saving of time and costs. Taking into account the fact that the rivets are less subjected to shear them in the state of the art, their cross-section can be reduced accordingly.

The invention has been shown with a rung equipped with bosses and provided to cooperate with an upright provided with oblong perforations. The oblong perforations may, of course, be provided at the ends of the rungs, while the or each lateral upright is equipped with small-dimensioned orifices bordered by bosses.

The invention has been shown with elements in relief formed by bosses 6 and 7 on either side of the orifice in the rung. However, other shapes of the elements in relief may be employed, in particular bent-back or embossed portions

What is claimed is:

1. Rung for a cable ladder comprising at least one orifice for passage of a member for attachment to an upright,
   wherein it comprises two elements in relief arranged on either side of said orifice and adapted to be engaged in an oblong perforation in said upright in which said attachment member is received, wherein said elements in relief present a geometric adapted each to abut against an edge of said oblong perforation.

2. The rung of claim 1, wherein said elements in relief are formed by bosses obtained by localized deformation of a web of said rung or of said upright.

3. The rung of claim 1, wherein the cooperation of shapes between said elements in relief and said edge ensuring a relative immobilization of said rung and said upright around said attachment member.

4. The rung of claim 1, wherein said elements in relief are deformable, by tightening said attachment member, so that they come into close abutment against the edge of said oblong perforation.

5. The rung of claim 1, wherein said elements in relief are substantially conical or in the form of a spherical cap, with a maximum diameter substantially equal to the smallest dimension of said oblong perforation.

6. The rung of claim 1, wherein it comprises an orifice for passage of an attachment member and two elements in relief near each of the ends thereof.

7. Cable ladder comprising at least one rung according to claim 1.

8. Upright for cable ladder comprising at least one orifice for passage of a member for attachment to a rung, wherein it comprises two elements in relief arranged on either side of said orifice and adapted to be engaged in an oblong perforation in said rung in which said attachment member is received, wherein said elements in relief present a geometric adapted each to abut against an edge of said oblong perforation.

9. The upright of claim 8, wherein said elements in relief are formed by bosses obtained by localized deformation of a web of said rung or of said upright.

10. The upright of claim 8, wherein the cooperation of shapes between said elements in relief and said edge ensuring a relative immobilization of said rung and said upright around said attachment member.

11. The upright of claim 8, wherein said elements in relief are deformable, by tightening said attachment member, so that they become into close abutment against the edge of said oblong perforation.

12. The upright of claim 8, wherein said elements in relief are substantially conical or in the form of a spherical cap, with a maximum diameter substantially equal to the smallest dimension of said oblong perforation.

13. Cable ladder comprising at least one upright according to claim 8.

14. Process for assembling a cable ladder, in which a rung and a lateral upright are connected by inserting an attachment member in an orifice and a perforation provided in said rung and in said upright, wherein it consists in positioning said orifice and perforation with respect to each other, introducing into said perforation elements in relief disposed on either side of said orifice such that the elements in relief abut against an edge defined by the perforation.

\* \* \* \* \*